United States Patent [19]

Bruneau

[11] 4,431,044
[45] Feb. 14, 1984

[54] SECURITY CLOSURE APPARATUS FOR BUILDINGS
[75] Inventor: Paul Bruneau, Checy, France
[73] Assignee: Usine de Metallurgie du Berry (UMB), Vierzon, France
[21] Appl. No.: 61,861
[22] Filed: Jul. 30, 1979
[30] Foreign Application Priority Data
Jul. 31, 1978 [FR] France .................. 78 22651
[51] Int. Cl.³ .................. E06B 3/48; E05C 19/18
[52] U.S. Cl. .................. 160/117; 292/259 R
[58] Field of Search .................. 160/117, 118; 49/15–20; 292/259 R

[56] References Cited
U.S. PATENT DOCUMENTS 2,887,735  5/1959  Coffey .................. 49/20
3,020,951  2/1962  Graulich .................. 160/117
3,856,373  12/1974  Tucich .................. 292/259 X
3,865,426  2/1975  Barnhart .................. 292/259 X

FOREIGN PATENT DOCUMENTS 1217177  5/1960  France .................. 160/118

Primary Examiner—Rodney H. Bonck
Attorney, Agent, or Firm—Weiser & Stapler

[57] ABSTRACT

A security shutter resistant to forced entry comprising a fixed frame and panels. The panels are provided with upper and lower brackets with which there cooperate locking elements to unite the panels and the frame in the closed position of the shutter. The locking elements are moved by rods and connected to levers which are unitary with control bars. The shutter is resistant to break-ins.

14 Claims, 7 Drawing Figures

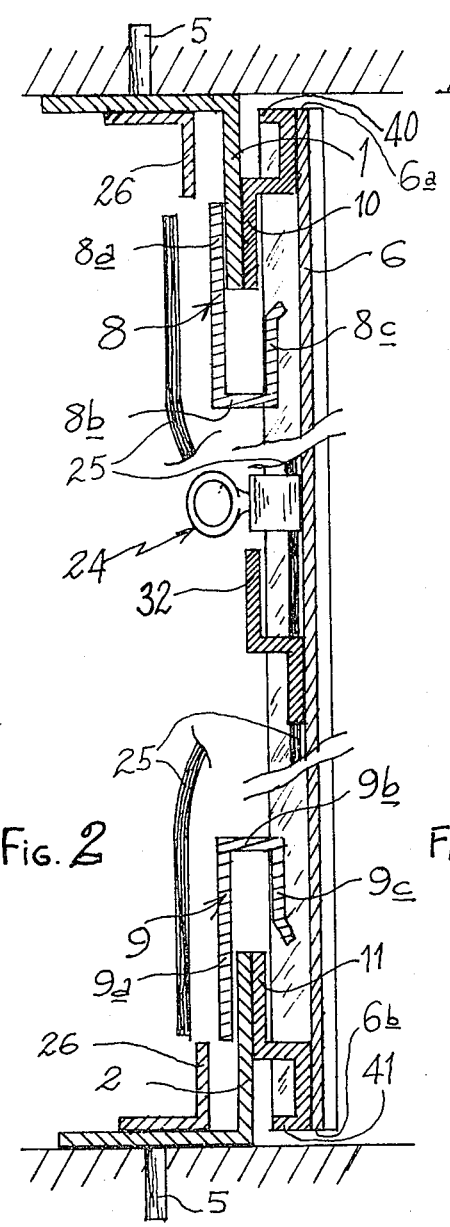
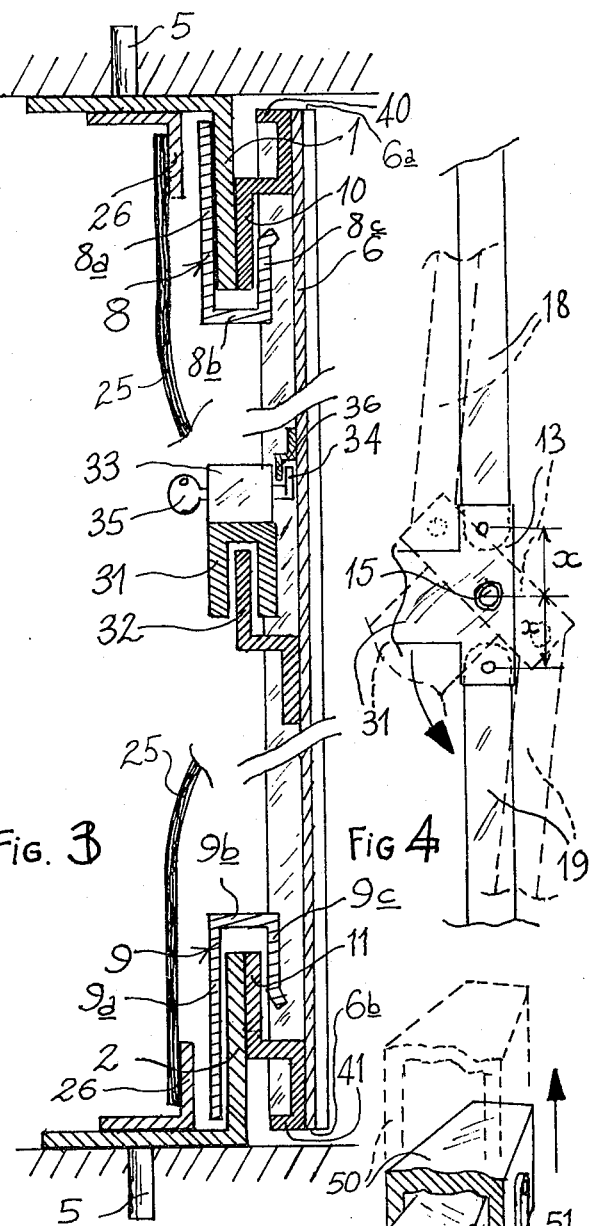
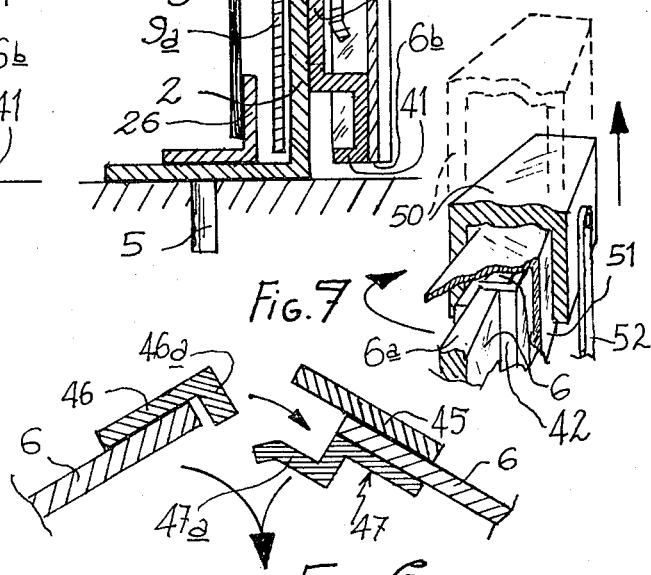
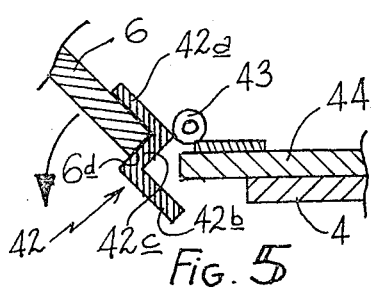

SECURITY CLOSURE APPARATUS FOR BUILDINGS

The resurgence of thefts, even through break-in, makes it more and more necessary to protect premises by means which are effective and also reasonably priced.

It is indeed impossible to imagine that one can protect residential premises by using the same means which are already known for vaults, for example.

A sufficient degree of effectiveness has already been reached for the closure of doors, due to locks and bolts, for example.

In contrast, the protection of windows is much more difficult. These can be covered in an effective manner only by means of unitary elements presenting as few cracks as possible toward the outside to avoid creating bearing points which could be utilized for levers by means of which the strength of a person is multiplied to such an extent that it becomes possible for him, for example, to spread apart two panels of a metal shutter.

The present invention relates to such a shutter which must be metallic because it is clear that shutters, roll-down shutters, or other structures of wood or synthetic material cannot prevent a break-in by themselves, regardless of their configuration.

Conventional metallic shutters exhibit weak spots, by means of which a person can easily cause their more or less partial destruction. By so doing, the person can enter and leave again through the gap thus created, or else can more simply reach the internal locking device and open what is left of the shutter in order to leave again with his loot.

Attempts have already been made to improve the security of such shutters. In general, the state of the art can be defined as follows:

German Pat. No. 153,661 relates to a locking device for a closed shutter. This arrangement includes two elements "h" and "i" which are placed on the outside of the shutter when they are in active position.

This presents a serious drawback because it is then possible for an individual with evil intentions to force these elements and render them inoperative, for example by inserting a piece of lumber between the locking element and the shutter.

This is an arrangement which is contrary to the spirit of the invention which is described below. This is so in relation to the explanations provided above.

The solution which consists of providing a structure of which at least a part extends outside the shutter is described further on as being less effective than other embodiments described and yet, this variant is still considerably superior to that which is described in the German Pat. No. 153,661. Indeed, according to the present invention, such a structure must straddle all the panels of the shutter and not be limited to a simple plate vulnerable on three sides and, furthermore, pivotally mounted so that the powerful action of a lever tends to cause the plate to pivot towards its inactive position.

The straddling of the extremities of the panels, in accordance with the invention, provides still another substantial protection since the locking element is vulnerable only on one side and cannot be rendered ineffective except by deforming it along its entire length, which is practically impossible.

British Pat. No. 1,166,738 shows that there is already known a locking device provided with recesses.

In this case what is involved is to immobilize the independent panels by bringing the locking device up against them in such a manner that each panel, over its entire thickness, penetrates into a recess.

This arrangement is described in the British Pat. No. 1,166,738 on page 2, column 2, line 69.

This is an arrangement which is fundamentally different from that of the present invention and the locking devices of the two arrangements, as well as their recesses, do not perform the same function because, in the case of the invention, what is involved is permitting the locking device to be situated as close as possible, and practically up against the internal face of each panel to prevent any play despite the presence of reinforcing beams.

French Pat. Nos. 376,052 and 450,034 relates to bolts and closing systems which are known in themselves and which have no relation to the invention because what is involved here is a control arrangement and not a locking bolt which is well known in itself.

French Pat. No. 441,335 describes a security bar which cooperates with certain panels of a shutter, but not all, and which, in any case, does not extend out to the stationary frame contrary to the arrangements claimed here which clearly show that the security bar is of a particular type and cooperates with a control system located on the frame, in such manner that the security bar contributes to the uniting of all the panels of the shutter and the frame in their middle, whereas in French Pat. No. 441,335 what is involved is only maintaining the panels of a shutter closed.

Addition No. 6,802 to French Pat. No. 340,488 describes a security bar associated with a lock but whose realization has no relationship to the invention.

French Pat. No. 1,217,177 describes a shutter, two leaves of which cooperate via a beam (not referenced) whose cross-section has the shape of a Z.

However, what is involved are the two leaves, themselves and, in addition, the free arm of the Z is located on the outside of the shutter. On the other hand, the invention contemplates that the bracket (free arm of the Z) must be located on the inside of the frame, which implies, in addition, that this involves the end panel positioned against the frame and not the edge of a panel which is to cooperate with another panel.

It is seen that none of these documents teaches locking the entirety of the panels of a shutter along their entire length when these are unfolded in order to unite them to the fixed frame, at least in their upper portion and in their lower portion and possibly also in their middle portion.

Likewise none of them shows how one can obtain automatically the operation of moveable locking elements and the placing into position of a security bar, that is by a single automatic movement.

The present invention overcomes the known disadvantages while making it possible to build metallic shutters by methods which are simple and relatively inexpensive, these shutters being susceptible of being forced only by employing very powerful devices and over a time period which is much longer that can reasonably be hoped for by an individual with evil intentions.

The invention will be well understood from the following detailed description made with reference to the attached drawing. It will be understood that the description and the drawing are provided only by way of illustrative example and are not limiting.

FIGS. 2 and 3 are cross-sectional views of a shutter in accordance with the invention, respectively in the inactive position and the active position of the locking elements.

FIG. 4 is a partial diagrammatic view showing a detail of operation.

FIG. 5 is a partial sectional view showing in detail the articulation of the shutter to the fixed frame.

FIG. 6 is a partial sectional view showing in detail the cooperation of the two panels of the shutter which must cooperate during closure.

FIG. 7 is a diagrammatic perspective view showing a specific embodiment of the invention.

Figure 1:
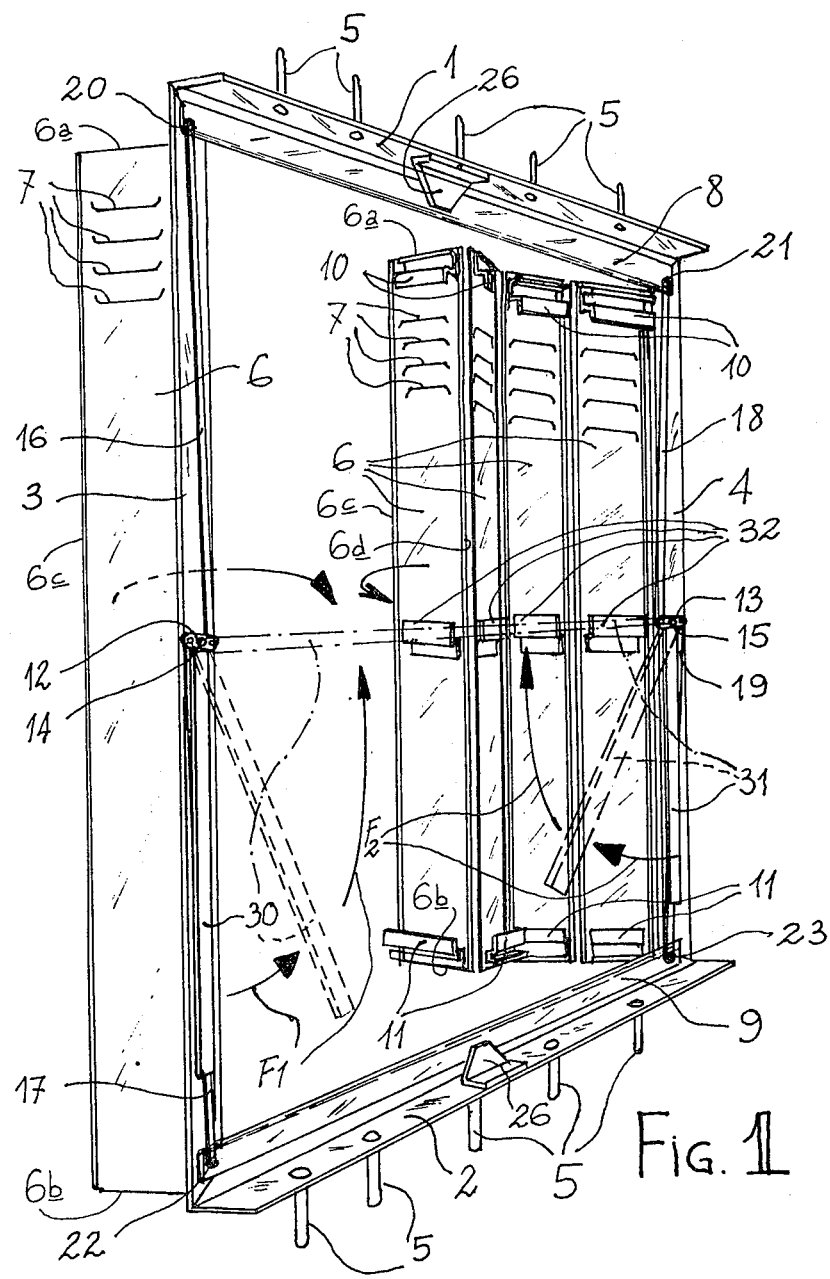
FIG. 1 is a perspective view of a shutter constructed in accordance with the invention.

The invention applies to shutters, jalousies, and other closures with articulated panels.

Referring to the drawing, it will be seen that a shutter in accordance with the invention comprises a chassis or fixed frame consisting of an upper runner 1 formed by an L-beam and a lower runner 2 also formed by an L-beam, the runners 1 and 2 being united by vertical uprights 3 and 4. The runners 1 and 2 as well as the uprights 3 and 4 are, for example, constituted of steel pieces welded at the corners.

The runners 1 and 2 are attached respectively to the roof and floor of the premises by means 5 such as threaded posts, screws, anchoring brackets, etc. The assembly which has been described is therefore, extremely strong and attached to the building by means which may be considered as invulnerable without proceeding to the destruction of the building itself.

The shutter itself is articulated relative to this fixed frame through means which are as invulnerable as possible and which make it possible in the closed position of the shutter, to unite the same with the frame.

The shutter comprises two series of panels articulated with respect to each other by any known means and, if desired, provided with ventilation slots 7.

In accordance with the invention, the assembly comprises two locking elements for the closed shutter which are positioned in the vicinity of the upper and lower free extremities 6a and 6b, respectively of panels 6 and which are mounted movably relative to the frame between an active position in which they cooperate with all of the deployed panels 6 to make these unitary with the frame and in a retracted position in which they leave all of the panels 6 free, means being provided for locking the two elements in active position.

It can be seen from the drawing that the assembly comprises an upper locking element 8 and a lower element 9 which extend transversely to the interior of the vertical wing of the runners 1 and 2 from upright 3 to upright 4. Each panel 6 of the shutter is provided in its upper portion with a bracket 10 consisting of a metal sheet suitably shaped so as to bear against and be welded to the inner face of panel 6 and to be pushed aside relative to the corresponding surface of panel 6. The separation between the panel 6 on the one hand and the brackets 10 on the other is substantially equal to the thickness of reinforcing beams with which the large sides of each panel 6 are provided.

Thus these brackets do not create noticable excess thickness and the panels 6 when they are folded back are not more bulky than conventional panels.

Symmetrically, each panel 6 comprises in the vicinity of its lower portion, a bracket 11 identical to bracket 10 but oriented at 180 degrees in such manner that brackets 10 and 11 are oriented one toward the other. When the panels are deployed, that is when the shutter is closed, the brackets 10 are placed against the outer face of the vertical wing of runner 1. Likewise, brackets 11 are against the outer surface of the vertical wing of runner 2.

In this position, all the brackets 10 on the one hand and all the brackets 11 on the other hand are aligned with respect to each other and constitute, at the top and the bottom of the shutter, a sort of channels which are practically continuous because the brackets 10 and 11 are almost as wide as the panels 6 themselves.

Furthermore, the locking element 8 has a section substantially in the shape of a U with unequal branches. The branch 8a is positioned inside the vertical wing of runner 1 and the base 8b has a width such that the branch 8c can extend between brackets 10 and the corresponding panel 6. In other words, the locking element 8 is capable of straddling simultaneously all the brackets 10 and the vertical wing of runner 1, which makes the upper portion of the shutter unitary with the fixed frame.

The locking element 9 is exactly symmetrical to element 8 and comprises a branch 9a inside the vertical wing runner 2 and a base 9b of width sufficient so that the branch 9c can be inserted at the exterior of brackets 11 and on the interior of the corresponding panel 6.

After having deployed the panel 6 and thereby closing the shutter, the locking element 8 and 9 must be placed in active position and maintained there. For this, there may be used various means of any known types used in locksmithing, such as bolts or the like.

In accordance with a characteristic of the invention, the elements 8 and 9 are simultaneously deployed to bring them from their retracted position into the active position in a single movement. This is achieved in the following manner:

Upon uprights 3 and 4, there are mounted levers 12 and 13 upon a central axis respectively designated 14 and 15, in such manner that the levers are capable of pivoting freely relative to uprights 3 and 4.

On one side and the other of element 14 for lever 12 and of axle 15 for lever 13, there are pivotally mounted rigid posts 16 and 17 on the one hand and 18 and 19 on the other hand. The posts 16 and 18 are connected to locking element 8 by means of pivots respectively designated 20 and 21. The posts 17 and 19 are joined to locking elements 9 by means of pivots respectively designated 22 and 23.

It is thus seen that in the position of FIG. 1, the levers 12 and 13 extend horizontally and the posts 16 and 18 are in low position whereas the posts 17 and 19 are in high position. This has as its consequence that the locking elements 8 and 9 are in a position of least separation and that the branches 8c and 9c extend outside the contour of brackets 10 and 11 (FIG. 2) so that the panels 6 are all free and can be moved like the panels of a conventional shutter. By placing the levers 12 and 13 in vertical position (FIG. 4), the posts 16 and 18 are displaced upwardly and the posts 17 and 19 downwardly by a distance x equal to that which separates the central pivot of each lever from the its lateral pivots to which the posts are articulated.

Thus, the locking element 8 is lifted and the locking element 9 is lowered (FIG. 3) so that the brackets 10 and 11 are made unitary with runners 1 and 2.

The operation of levers 12 and 13 is carried out, in accordance with a characteristic of the invention, by means of bars respectively designated 30 and 31, of which one end is unitary with levers 12 and 13. The axle of bars 30 and 31 being perpendicular to the axle of levers 12 and 13, the bars 30 and 31 are vertical and to the right of uprights 3 and 4 when the levers 12 and 13 are horizontal. As a result of which the locking elements 8 and 9 are in retracted position and the shutter is then opened.

Correspondingly, when levers 12 and 13 are vertical and the locking elements 8 and 9 are in active position, the bars 30 and 31 will be horizontal following the line shown in broken lines in FIG. 1.

In accordance with a characteristic of the invention, bars 30 and 31 have a length such that they can cooperate with each other and extend transversely to the shutter to constitute a security bar.

To that end, each panel 6 receives a bracket 32 similar to brackets 11, the bars 30 and 31 then extending parallel to runners 1 and 2 and cooperating with the brackets 32 of panels 6.

It is seen in FIG. 3 that bars 30 and 31 may have a cross-section substantially in the form of an inverted U so that the brackets 32 are placed between the two branches of the U. The complete closure of the shutter presupposes that, after having deployed the panels 6 and having maintained them so by means of lock 24, bars 30 and 31 are lifted in the direction of arrows F1 and F2 until they have gone beyond the level of brackets 32 after which they are returned to the horizontal. It will be noted that in this way, the user need not be concerned with the correct positioning of bars 30 and 31 relative to brackets 32 because, automatically, the locking elements 8 and 9 are moved through the intermediary of levers 12 and 13. The free end of bar 30 must be capable of being straddled by the free end of bar 31 to insure the continuity of transverse locking which is constituted by bars 30 and 31.

Referring to FIGS. 2 and 3, the lock 24 includes a pair of locking elements 25. Upon actuation of the lock the elements 25 are moved from their inactive position, as indicated in FIG. 2, to their active, or locking position behind the vertical extension of L-shaped brackets 26 which are secured to the runners 1 and 2, respectively. The lock 24 can be of any conventional type, and does not form a part of the instant invention.

To insure absolute stability of the movable assembly, the free end of bar 31 can be provided with a locking system. According to the invention, this locking system is advantageously constituted of a lock 33 whose bolt 34 can be moved by a removable key 35 to be placed in closed position in a catch which is formed by the combination of a panel 6 and a bent bracket 36.

The presence of a lock particularly a security lock, has the advantage of preventing the opening of the shutter, even from the inside of the premises on the assumption that someone has been able to get into these premises by another means through some other place.

It will be seen that a shutter according to the invention is made unitary with the fixed frame at its upper portion, at its lower portion and at its middle portion. It is therefore practically impossible to spread the panels toward the outside even by cutting all of the joints which connect the panels to each other and even by introducing into the interstices a powerful lever. It will be noted that with the embodiment which has been described, the locking will be accentuated by arching the panels toward the outside because this arching would have the effect of lowering the brackets 10 toward the base 8b and of lifting the brackets 11 toward the base 9b.

So that the shutter will be even less vulnerable all interstices should be reduced or eliminated. Those which exist between the panels 6 are masked, as is already known in itself, by reinforcing beams which are welded to the edge of panel 6.

The vulnerable interstices are therefore those which remain on the four sides of the quadrilateral constituted by the frame and the middle vertical interstice between the two sets of panels respectively on the right and on the left of the shutter.

The problem is solved in accordance with the invention in the following manner:

The upper and lower edges 6a and 6b, respectively, of each panel 6 are provided with a horizontal bracket respectively designated 40 and 41 which are situated as close as possible to the lintel and to the ground to resist the insertion of a lever toward the interior of panel 6.

The lip, or vertical edge 6d of the panel adjacent the rim 44 associated with the vertical upright 4 is provided with a Z-shaped beam 42. This beam has an outer branch 42a interconnected to a inner branch 42b by a connecting branch 42c. The outer branch carries hinge 43, which joins the endmost panel 6 to the rim 44. The inside branch 42b is located inside of this rim.

Assuming that one could nevertheless insert a lever towards the outside of rim 44 and the inside of panel 6, a force applied to that lever to deform a panel 6 toward the outside will be resisted in extremely strong manner by the branch 42b, which bears toward the interior of the rim 44 along the entire height of the shutter.

Naturally, what has been described with respect to the right segments of the shutter applies to the left segments, that is the two lips are protected in the same manner. As for the vertical middle interstice, it comprises an outer welded plate 45 as is already known, which is located outside the reinforcement beam 46 welded to the outer panel 6.

According to the invention, the panel 6 which carries plate 45 has on its inner face, a beam 47 which presents a lip 47a extending beyond the edge of panel 6 so as to create a continuous vertical channel whose cross-section is substantially U-shaped and which must receive, by bracketing, the lip 46a of beam 46. FIG. 6 clearly shows that this construction makes it possible to resist the effective introduction of a lever because if against all possibilities one were to succeed in inserting one between the crest of plate 45 and the lip 46a, it would not be possible to act upon it either in one direction or the other without the resistance of either plate 45 or lip 47a.

With the embodiment which has been described, the locking elements 8 and 9 act from the inside toward the outside and therefore are to the right of panels 6. Since these are edged with reinforcement beams, as is known in itself, the wings 8c and 9c must be notched with notches to the right of the reinforcing beams so that the wings 8c and 9c reach without impediment the position between panel 6 and brackets 10 and 11. However, it is possible to use another embodiment than this, provided the panels 6 and the fixed frame are made unitary.

In FIG. 7 there is illustrated schematically such another embodiment, which comprises at the upper portion of the shutter a beam of inverted U-shape 50 which, in active position, crowns simultaneously the panels 6, their reinforcing beam 42, and a portion of the fixed frame 51.

The lower portion is provided with a U-shaped beam not shown, symmetrical to beam 50 and these two beams are moved by posts 52 similar to posts 16 to 19 described above.

With this embodiment, the locking elements 50 no longer act from inside toward the outside but from outside toward the inside. This construction may prove simpler than the former because it eliminates brackets 10 and 11, but on the other hand, it is less effective because urging of the panels toward the outside tends to make these leave the beams 50 rather than increasing the locking. The invention is not limited to the sole embodiments described and shown but on the contrary encompasses all variants thereof.

In particular, the brackets 10, 11 and 32 may have a more or less great width, it being understood that the wider they are, the more strength they give to the assembly. Likewise, the bars 30 and 31 may extend in a plane parallel to locking elements 8 and 9 without, however, being horizontal.

I claim:

1. Closing system of the type comprising at least one set of panels which comprises a plurality of panels, of which one is an affixed panel movably mounted to a fixed frame, and the furthermost panel from the affixed panel within the same set being an end panel adapted for engagement to a fixed frame or to another end panel, said panels being connected to each other by joints, the panels having an upper and lower free extremity, at least one panel of each set having two respectively upper and lower rims, the closing system comprising two locking elements for the closed system which are positioned in the vicinity of the free extremities of the panels and which are movably mounted relative to the frame between an active position in which they cooperate with all of the deployed panels to make them unitary with the frame and a retracted position in which they leave all the panels free, means being provided for locking the two elements in the active position, each of the upper and lower rims being placed against a portion of the frame which is continuous and parallel to the aligned rims of the deployed panels and the locking element which, in its active position, straddles simultaneously all the aligned upper rims and a portion of the frame whereas the other locking element in its active position straddles simultaneously all the aligned lower rims and another portion of the frame.

2. Closing system according to claim 1 characterized in that the rims are constituted by the edges of the short sides of each panel, this edge being preferably reinforced.

3. Closing system according to claim 1 characterized in that the rims are constituted by brackets which bear against the face of each panel and situated on its interior and which are spaced from the plane of said face, the two upper and lower brackets of each panel extending toward each other.

4. Closing system according to claim 3 characterized in that the spacing of the brackets from the plane of the panel is substantially equal to the thickness of a reinforcing beam with which the large sides of each panel are provided.

5. Closing system according to claim 3 characterized in that the large sides of each panel are provided with a reinforcing beam, each locking element is notched with a recess which is situated to the right of each reinforcing beam when the panels are deployed.

6. Closing system according to any one of claim 1, characterized in that each end of each locking element receives through a pivoting means the end of a rigid post connected at its opposite end to a control means constituted by a lever pivotally mounted on the frame and capable of occupying an active position and an inactive position, the length of the post and the placement of the lever being selected so that the locking element and the lever are simultaneously in active position and simultaneously in inactive position.

7. Closing system according to claim 6 characterized in that the lever receives the extremities of two posts on one side and the other of its axle by which it is pivotally mounted on the frame, the posts being connected to different locking elements.

8. Closing system according to claim 7, characterized in that the system comprises two levers, each receiving two posts, which correspond to the ends of two locking elements positioned on the same side.

9. Closing system according to claim 7 characterized in that each lever is unitary with a bar which is located parallel to the locking elements when the panels are deployed and the locking elements are in active position, means being provided to latch the bar when it is parallel to the locking elements.

10. Closing system according to claim 9 characterized in that each panel receives a bracket similar to the above, but situated at such a level that each bar is placed between the surfaces of the panels and the corresponding aligned brackets when the panels are deployed.

11. Closing system according to claim 1, characterized in that the bar or at least one of the bars is provided with a lock whose bolt penetrates into a catch unitary either with the frame or with the face of the shutter which is on the inside.

12. Closing system according to claim 1, characterized in that the rim of the panel joined to the frame comprises a plate which is located on the inside of the frame when the panels are deployed.

13. Closing system of the type comprising two sets of panels which comprises a plurality of panels, of which one is an affixed panel movably mounted to one side of a fixed frame, the furthermost panel from the affixed panel within the same set being an end panel adapted for engagement to the opposite side of the fixed frame, the end panels engaging when all the panels are deployed, said panels being connected to each other by joints, the panels having an upper and lower free extremity, at least one panel of each set having an upper and lower rim, the free edge of one of the two end panels penetrating between two rims respectively internal and external provided upon the other end panel parallel to the plane of panels, the closing system comprising two locking elements for the closed system which are positioned in the vicinity of the free extremities of the panels and which are movably mounted relative to the frame between an active position in which they cooperate with all of the deployed panels to make them unitary with the frame and a retracted position in which they leave all the panels free, means being provided for locking the two elements in the active position.

14. Closing system of the type comprising at least one set of panels which comprises a plurality of panels, of which one is an affixed panel movably mounted to a fixed frame, the furthermost panel from the affixed panel within the same set being an end panel adapted for engagement to a fixed frame or to another end panel, said panels being connected to each other by joints, the panels having an upper and lower free extremity, at least one panel of each set having an upper and lower rim, the closing system comprising two locking elements for the closed system which are positioned in the vicinity of the free extremities of the panels and which are movably mounted relative to the frame between an active position in which they cooperate with all of the deployed panels to make them unitary with the frame and a retracted position in which they leave all the panels free, means being provided for locking the two elements in the active positions and control means for simultaneously moving the two locking elements between said active and retracted positions.

* * * * *